United States Patent
Takamine

(10) Patent No.: US 11,641,454 B2
(45) Date of Patent: May 2, 2023

(54) PROJECTION APPARATUS

(71) Applicant: SEIKO EPSON CORPORATION, Tokyo (JP)

(72) Inventor: Yusaku Takamine, Azumino (JP)

(73) Assignee: SEIKO EPSON CORPORATION, Tokyo (JP)

(*) Notice: Subject to any disclaimer, the term of this patent is extended or adjusted under 35 U.S.C. 154(b) by 161 days.

(21) Appl. No.: 17/366,804

(22) Filed: Jul. 2, 2021

(65) Prior Publication Data
US 2022/0006991 A1  Jan. 6, 2022

(30) Foreign Application Priority Data
Jul. 6, 2020  (JP) ............... JP2020-116207

(51) Int. Cl.
H04N 9/31 (2006.01)
G01C 9/00 (2006.01)

(52) U.S. Cl.
CPC ........... H04N 9/3194 (2013.01); H04N 9/317 (2013.01); G01C 9/00 (2013.01)

(58) Field of Classification Search
IPC ......... H04N 25/621, 25/63, 25/65, 7/18, 9/3105, 9/3167
See application file for complete search history.

(56) References Cited

U.S. PATENT DOCUMENTS

| 2007/0171377 A1 | 7/2007 | Inoue | |
| 2009/0095047 A1* | 4/2009 | Patel | G06K 7/015 |
| | | | 73/1.01 |
| 2021/0239976 A1* | 8/2021 | Pridie | G02B 30/52 |

FOREIGN PATENT DOCUMENTS

| JP | 2005-121689 A | 5/2005 |
| JP | 2007-193203 A | 8/2007 |
| JP | 2009-244379 A | 10/2009 |

* cited by examiner

Primary Examiner — Samira Monshi
(74) Attorney, Agent, or Firm — Oliff PLC

(57) ABSTRACT

A projection apparatus includes a projection system, a distance measuring sensor that is used to adjust the focal point of the projection system and outputs infrared light in the frontward direction, and an enclosure that houses the projection system and the distance measuring sensor. An exit port of the projection system is disposed at a position which is shifted from the distance measuring sensor in a second direction opposite the first direction. The enclosure has a detection opening via which the infrared light exits. The distance measuring sensor has a detection range over which distance detection is allowed and a non-detection range over which no distance detection is allowed and which is shifted from the detection range toward the distance measurement sensor, and the distance measuring sensor is disposed at a distance from the detection opening, the distance including the non-detection range of the distance measuring sensor.

9 Claims, 11 Drawing Sheets

PROJECTION APPARATUS

The present application is based on, and claims priority from JP Application Serial Number 2020-116207, filed Jul. 6, 2020, the disclosure of which is hereby incorporated by reference herein in its entirety.

BACKGROUND

1. Technical Field

The present disclosure relates to a projection apparatus.

2. Related Art

A projector as a projection apparatus that projects video images on a screen needs to perform focus adjustment. For example, JP-A-2005-121689 discloses a projector that automatically performs the focus adjustment. According to JP-A-2005-121689, the projector includes a distance measuring sensor that measures the distance between the screen and the projector.

The projector includes a projection lens, which includes a focusing lens. To perform the focus adjustment, the focusing lens is moved along the optical axis. The focus lens is moved by a focusing motor. The focusing motor and distance measuring sensor are driven by a control circuit. To perform the focus adjustment, the distance measuring sensor measures the distance between the projector and the screen. The control circuit attempts to perform the focus adjustment by driving the focusing motor based on the result of the measurement.

When the screen is separate from the projector by a large distance, the projector in the course of projection of video images discourages in some cases persons from walking between the projector and the screen. In view of the point described above, short-focal-length projectors having a short projection distance between the projector and the screen have been developed.

Too short a distance from the distance measuring sensor to the screen, however, does not allow the distance measuring sensor to measure the distance between the projector and the screen, causing a problem of being unable to perform the focus adjustment. In detail, the reason for this is that the distance measuring sensor can only detect a distance that is longer than or equal to a detectable distance and cannot detect distances that are shorter than the detectable distance and fall within a non-detection range.

SUMMARY

A projection apparatus includes a projection system, a distance measuring sensor that is used to adjust a focal point of the projection system and outputs a detection signal in a first direction, and an enclosure that houses the projection system and the distance measuring sensor. An exit port of the projection system is disposed at a position which is shifted from the distance measuring sensor in a second direction that opposite the first direction. The enclosure has a detection opening via which the detection signal exits. The distance measuring sensor has a detection range over which distance detection is allowed and a non-detection range over which no distance detection is allowed and which is shifted from the detection range toward the distance measurement sensor, and the distance measuring sensor is disposed at a distance from the detection opening, the distance including the non-detection range of the distance measuring sensor.

A projection apparatus including a projection system, a distance measuring sensor that is used to adjust a focal point of the projection system and outputs a detection signal in a first direction, and an enclosure that houses the projection system and the distance measuring sensor. An exit port of the projection system is disposed at a position which is shifted from the distance measuring sensor in a second direction opposite the first direction. The enclosure includes an endmost section located in an endmost position in the first direction. The distance measuring sensor has a detection range over which distance detection is allowed and a non-detection range over which no distance detection is allowed and which is shifted from the detection range toward the distance measurement sensor, and the distance measuring sensor is disposed at a distance from the endmost section of the enclosure, the distance including the non-detection range of the distance measuring sensor.

DESCRIPTION OF EXEMPLARY EMBODIMENTS

First Embodiment

Figure 1:
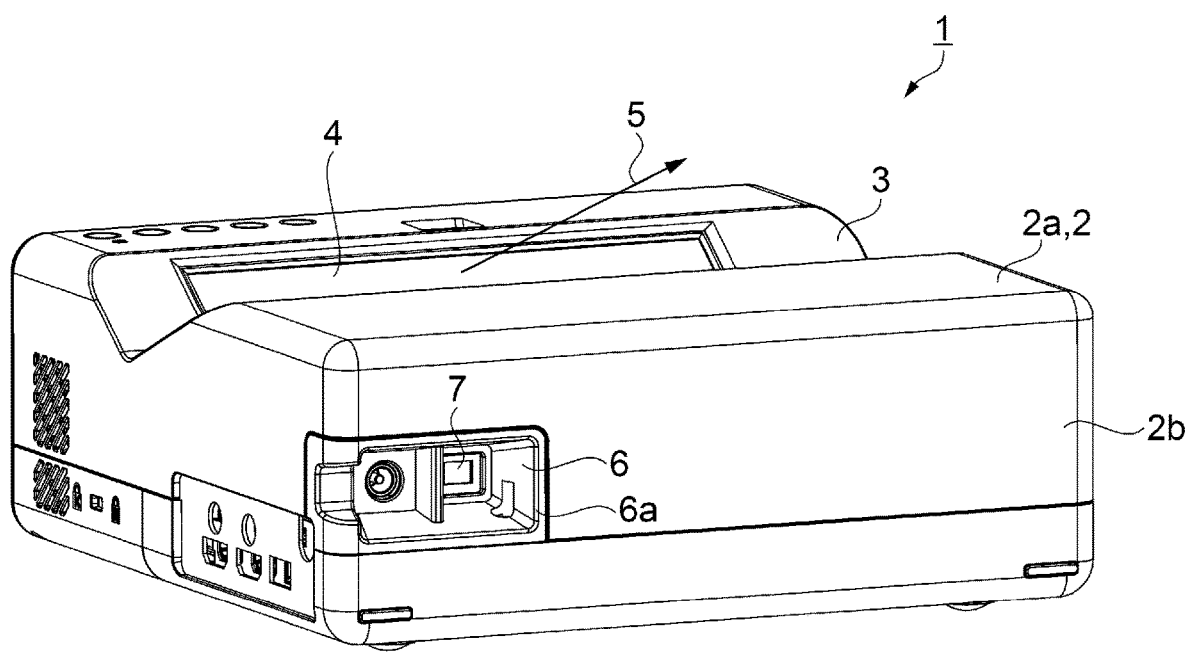
FIG. 1 is a schematic perspective view showing the configuration of a projector according to a first embodiment.
Figure 1:
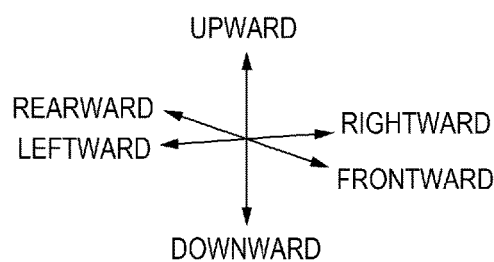

A projector 1 as the projection apparatus includes an enclosure 2 having a shape close to the shape of a rectangular parallelepiped, as shown in FIG. 1. The arrows in FIG. 1 represent the directions in which the six surfaces of the rectangular parallelepiped enclosure 2 face. As indicated by the arrows, the enclosure 2 has surfaces facing frontward, rearward, upward, downward, rightward, and leftward. The enclosure 2 has an upper surface 2a, which faces upward. The upper surface 2a is provided with a groove 3. The groove 3 has two intersecting surfaces and is elongated in the right-left direction. An exit port 4 is disposed in one of the two surfaces that is the surface facing frontward. In other words, out of the surfaces of the enclosure 2, the surface in which the exit port 4 is disposed is the upper surface 2a. A luminous flux 5 exits via the exit port 4. The luminous flux 5 travels frontward and upward.

The enclosure 2 includes a front surface 2b, which faces frontward. The front surface 2b is provided with a recess 6. A distance measuring sensor 7 is disposed in the recess 6. The distance measuring sensor 7 is housed in the enclosure 2. The location where the side surface that forms the recess 6 intersects the front surface 2b is called a detection opening 6a. In other words, the recess 6 of the enclosure 2 is disposed between the distance measuring sensor 7 and the detection opening 6a. The enclosure 2 has the detection opening 6a. The exit port 4 is disposed behind the distance measuring sensor 7, that is, in a position shifted from the distance measuring sensor 7 in the rearward direction, which is the opposite direction from the frontward direction. The frontward direction and the rearward direction can be defined as a first direction and a second direction, respectively.

Figure 2:
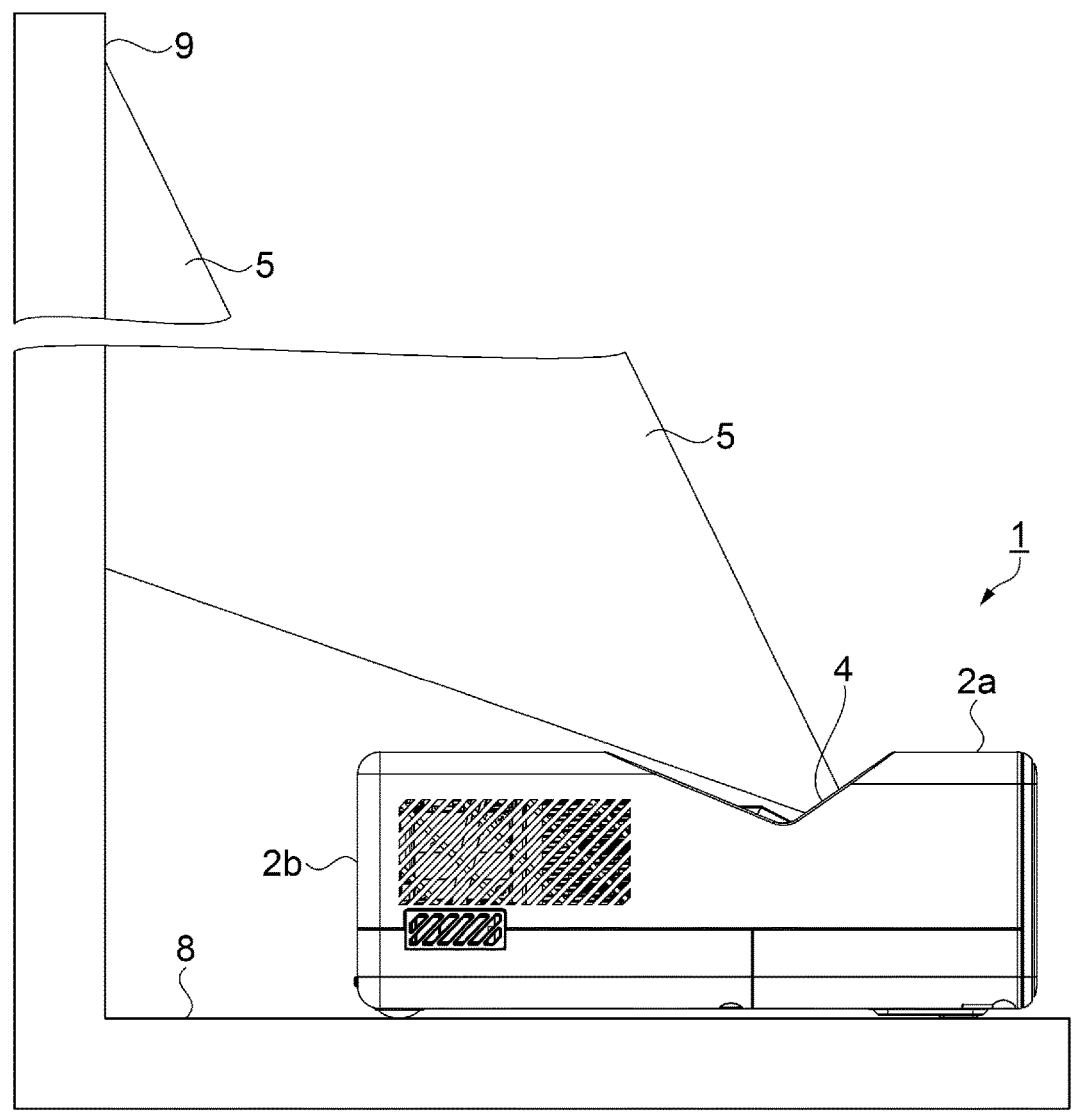
FIG. 2 is a diagrammatic side view for describing the relationship between the projector and a screen.
Figure 2:
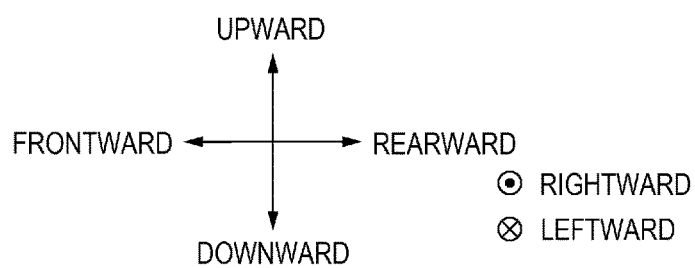

The projector 1 is installed with the lower side thereof facing a floor surface 8, as shown in FIG. 2. A screen 9 as a projection surface is installed upright on the floor surface 8. The screen 9 is irradiated with the luminous flux 5, so that video images are projected on the screen 9. The projector 1, which can be installed at a location close to the screen 9, is called a short-focal-length projector.

Figure 3:
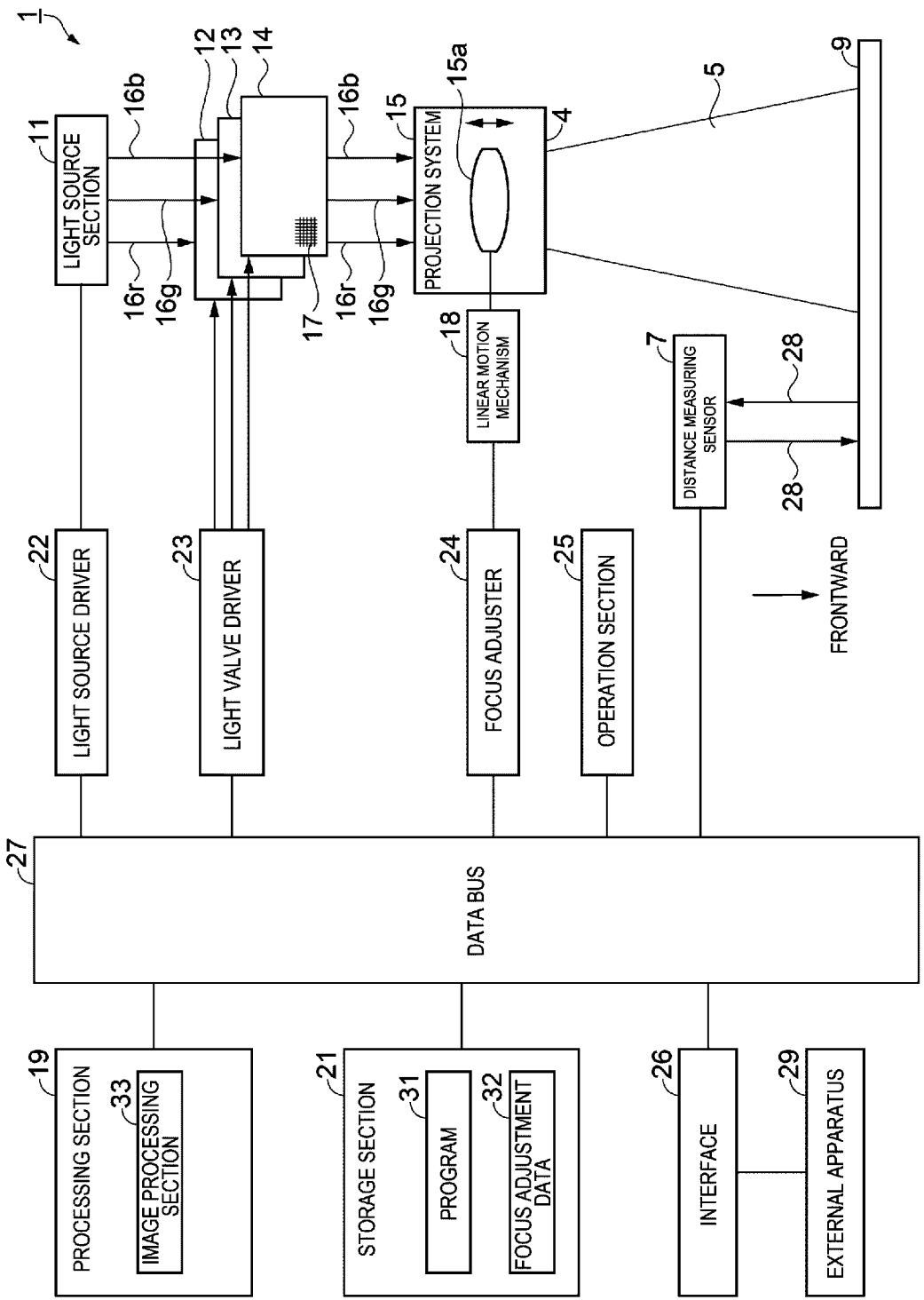
FIG. 3 is a block diagram showing the configuration of the projector.

The projector 1 includes a light source section 11, a red light valve 12, a green light valve 13, a blue light valve 14, and a projection system 15, as shown in FIG. 3. The light source section 11 outputs red light 16r to the red light valve 12. The light source section 11 outputs green light 16g to the green light valve 13. The light source section 11 outputs blue light 16b to the blue light valve 14.

The red light valve 12 modulates the red light 16r. The green light valve 13 modulates the green light 16g. The blue light valve 14 modulates the blue light 16b. The red light valve 12, the green light valve 13, and the blue light valve 14 each have a plurality of pixels 17 arranged in a matrix. Drive voltage is applied to each of the pixels 17. When drive voltage according to an image signal is applied to each of the pixels 17, the pixel 17 has light transmittance set in accordance with the image signal. The red light 16r, the green light 16g, and the blue light 16b outputted from the light source section 11 are modulated when passing through the pixels 17, and an image according to the image signal is formed on a color light basis. The red light 16r, the green light 16g, and the blue light 16b pass through the red light valve 12, the green light valve 13, and the blue light valve 14, respectively, and enter the projection system 15.

The projection system 15 combines the red light 16r, the green light 16g, and the blue light 16b with one another to form the luminous flux 5. The projection system 15 includes a focus adjustment lens 15a. The focus adjustment lens 15a is moved by a linear motion mechanism 18, which is a lens moving mechanism. When the focus adjustment lens 15a is moved, the position where the video images are formed moves. The projection system 15 is housed in the enclosure 2 and causes the luminous flux 5 to exit via the exit port 4.

The projector 1 includes a processing section 19, which performs a variety of types of computation as a processor, and a storage section 21. The processing section 19 includes a CPU (central processing unit) and carries out a variety of processes. The storage section 21 stores a variety of types of information. A light source driver 22, a light valve driver 23, a focus adjuster 24, an operation section 25, the distance measuring sensor 7, and an interface 26 are coupled to the processing section 19 via a data bus 27.

The light source driver 22 drives the light source section 11. When the operation section 25 accepts power-on operation, the light source driver 22 causes the light source section 11 to emit light.

The light valve driver 23 drives the red light valve 12, the green light valve 13, and the blue light valve 14 based on the image signal generated by the processing section 19.

The focus adjuster 24 drives the linear motion mechanism 18 to move the focus adjustment lens 15a to perform the focus adjustment of the luminous flux 5.

The operation section 25 includes a variety of operation buttons or operation keys or a touch panel. The operation section 25 accepts input operation from a user of the projector 1.

The distance measuring sensor 7 measures the distance between the distance measuring sensor 7 and the screen 9. The distance measuring sensor 7 can be an optical sensor using infrared light 28 as a detection signal, a millimeter wave sensor using a radio wave as the detection signal, or an ultrasonic sensor. In the present embodiment, for example, an optical sensor is used as the distance measuring sensor 7. The infrared light 28 exits via the detection opening 6a. The focus adjuster 24 adjusts the position of the focus adjustment lens 15a in accordance with the distance between the distance measuring sensor 7 and the screen 9. The distance measuring sensor 7 is used to adjust the focal point of the projection system 15 and outputs the infrared light 28 in the forward direction.

An external apparatus 29 is electrically coupled to the interface 26. The external apparatus 29 is, for example, a computer, a card-shaped recording medium, such as a memory card, or a USB (universal serial bus) memory device. The external apparatus 29 stores image data and voice data for each of a plurality of content images. The image data and voice data are transmitted to the processing section 19 via the interface 26 and the data bus 27.

The storage section 21 includes a semiconductor memory, such as a RAM and a ROM, and an external storage device, such as a hard disk. The storage section 21 stores a program 31, which provides, for example, a control procedure of the action of the projector 1. The storage section 21 further stores focus adjustment data 32. The focus adjustment data 32 contains data on a table showing the relationship of the distance between the distance measuring sensor 7 and the screen 9 with the position of the focus adjustment lens 15a.

The processing section 19 controls the action of the projector 1 in accordance with the program 31 stored in the storage section 21. The processing section 19, to achieve the functions thereof, includes a variety of functional portions. As a specific functional portion, the processing section 19 includes an image processing section 33. The image processing section 33 uses the image data stored in the external apparatus 29 to generate an image signal representing a content image. The light valve driver 23 drives the red light valve 12, the green light valve 13, and the blue light valve 14 based on the image signal generated by the image processing section 33.

Figure 4:
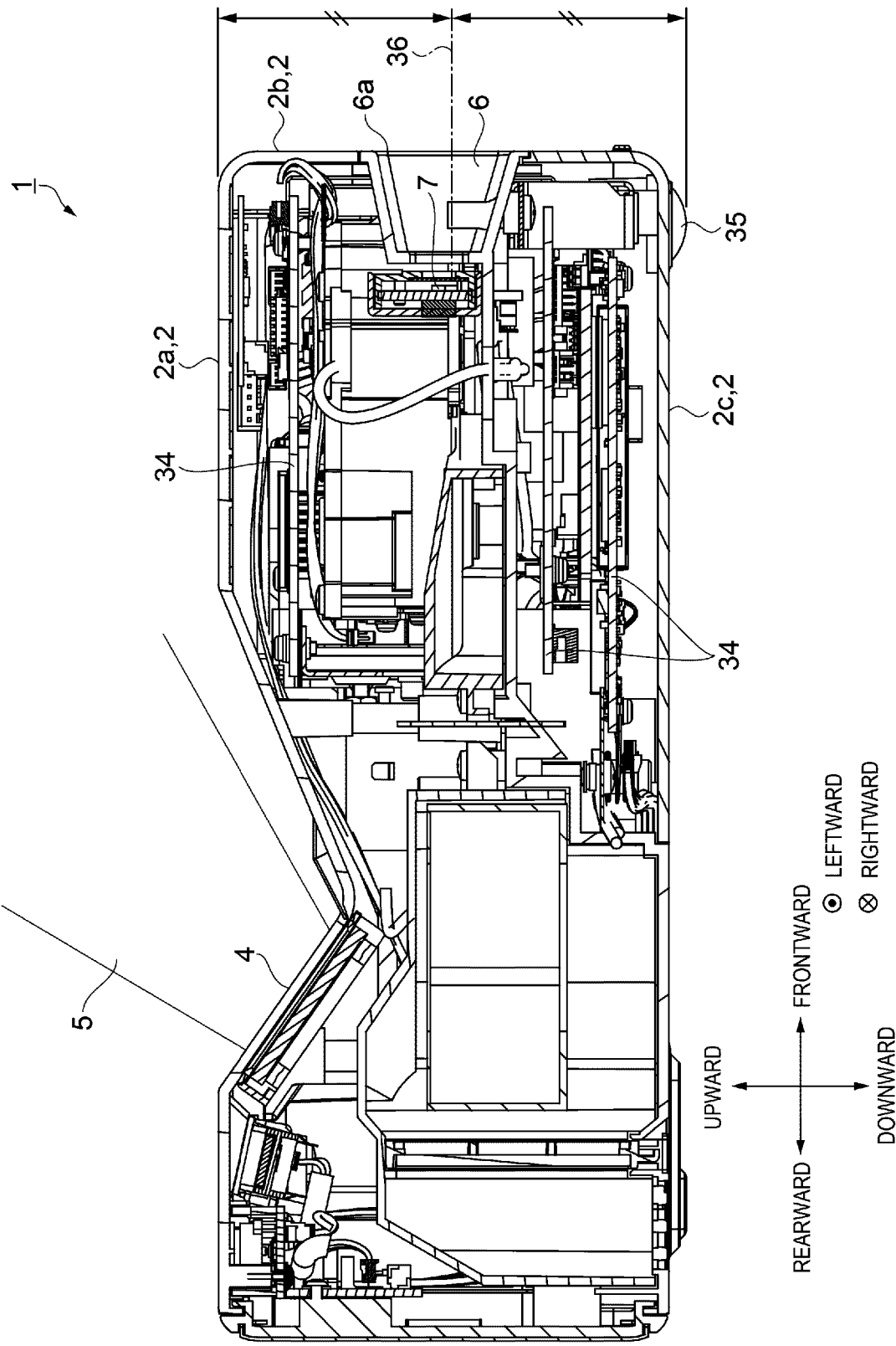
FIG. 4 is a side cross-sectional view showing the internal structure of the projector.

The exit port 4 is disposed behind the distance measuring sensor 7, as shown in FIG. 4. A circuit substrate 34 is disposed in the enclosure 2. The processing section 19, the storage section 21, the light source driver 22, the light valve driver 23, the focus adjuster 24, and other components are mounted on the circuit substrate 34.

The lower surface of the enclosure 2 is a lower surface 2c. The lower surface 2c is the opposite surface from the upper surface 2a. The surface of a first protrusion 35, which is a leg in contact with the floor surface 8, is part of the lower surface 2c. The distance measuring sensor 7 is shifted from a middle point 36 between the upper surface 2a and the lower surface 2c toward the upper surface 2a.

Part of the infrared light 28 outputted from the distance measuring sensor 7 is radiated to the floor surface 8, on which the projector 1 is installed. According to the configuration described above, the distance measuring sensor 7 is separate from the floor surface 8. The configuration can prevent the infrared light 28 reflected by the floor surface 8 from entering the distance measuring sensor 7 and forming a noise component.

Figure 5:
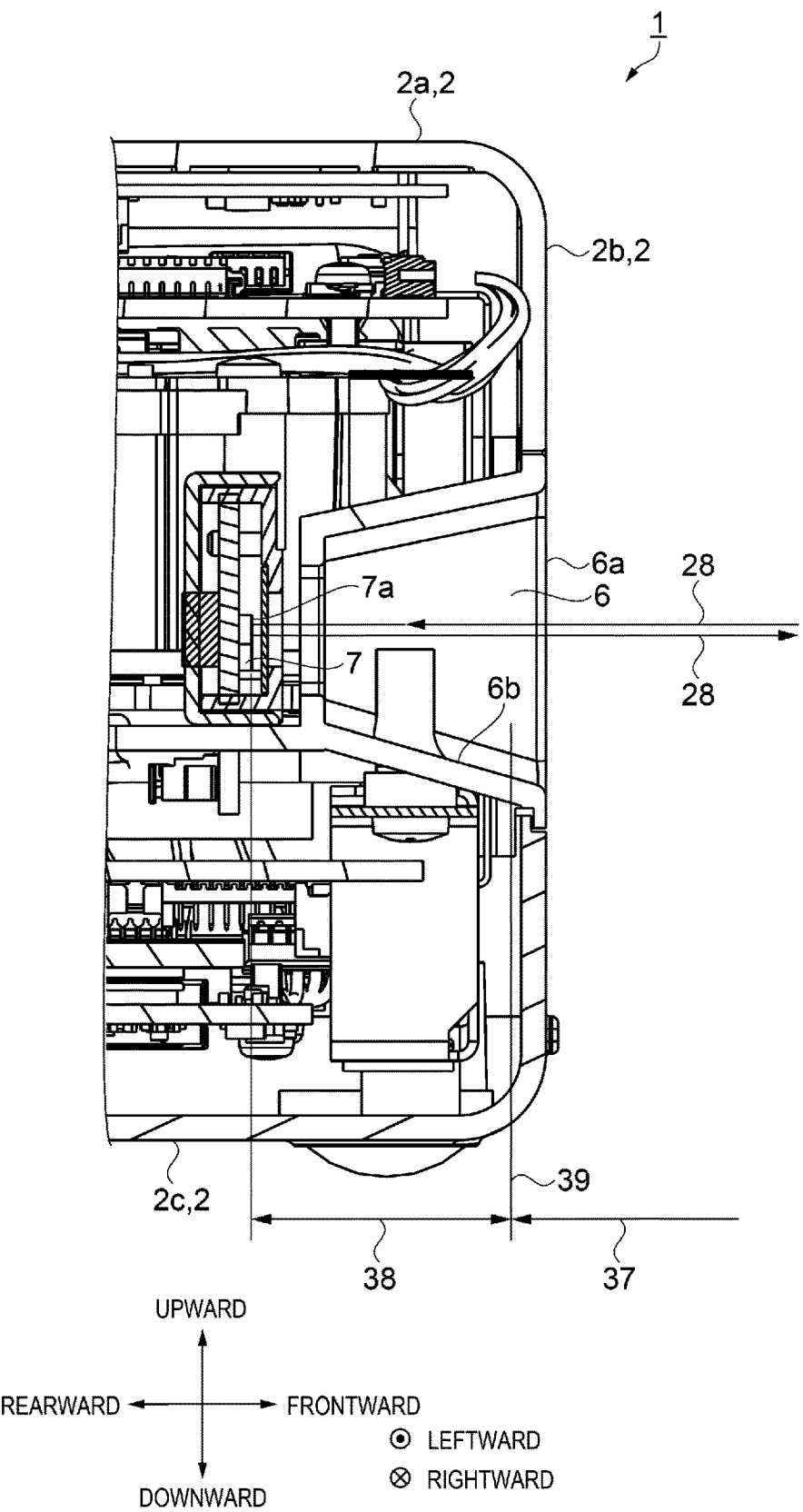
FIG. 5 is a key-part side cross-sectional view showing a distance measuring sensor and a recess.

The distance measuring sensor 7 has a detection range 37, over which distance detection is allowed, and a non-detection range 38, over which no distance detection is allowed and which is shifted from the detection range 37 toward the distance measurement sensor 7, as shown in FIG. 5. The distance measuring sensor 7 is disposed at a distance from the detection opening 6a, the distance including the non-detection range 38 of the distance measuring sensor 7.

According to the configuration described above, the distance between the detection opening 6a and the distance measuring sensor 7 includes the length of the non-detection range 38. The region outside the detection opening 6a is therefore the detection range 37. As a result, the distance measuring sensor 7 can detect the distance to the screen 9 even when the screen 9, which is the target on which the projection is performed, is close to the projector 1. In particular, the configuration of the projector 1, in which the exit port 4 of the projection system 15 is disposed behind the distance measuring sensor 7, is effective in reduction in the focal length over which the projection is performed.

A boundary 39 between the detection range 37 and the non-detection range 38 of the distance measuring sensor 7 is located inside the enclosure 2 and shifted from the detection opening 6a. According to the configuration described above, the distance between the detection opening 6a and the distance measuring sensor 7 is longer than the length of the non-detection range 38. The region outside the detection opening 6a is therefore the detection range 37. As a result, the distance measuring sensor 7 can detect the distance to the screen 9 even when the screen 9 is close to the projector 1.

A side surface 6b of the recess 6 inclines with respect to the direction perpendicular to a surface 7a of the distance measuring sensor 7. That is, the side surface 6b of the recess 6 is an oblique surface with respect to the frontward direction. According to the configuration described above, the side surface 6b, which forms the recess 6, inclines in the region between the distance measuring sensor 7 and the detection opening 6a. Even when an object enters the recess 6, the object moves along the side surface 6b and out of the recess 6 via the detection opening 6a. Attenuation of the intensity of the infrared light 28 outputted by the distance measuring sensor 7 due to the object can therefore be suppressed.

Second Embodiment

In the first embodiment described above, the boundary 39 between the detection range 37 and the non-detection range 38 of the distance measuring sensor 7 is located inside the enclosure 2. The boundary 39 between the detection range 37 and the non-detection range 38 of the distance measuring sensor 7 may be located at the detection opening 6a.

According to the configuration described above, the distance between the detection opening 6a and the distance measuring sensor 7 is equal to the length of the non-detection range 38. The region outside the detection opening 6a is therefore the detection range 37. As a result, the distance measuring sensor 7 can detect the distance to the screen 9 even when the screen 9 is close to the projector 1. Further, the space occupied by the distance measuring sensor 7 in the enclosure 2 can be reduced.

Third Embodiment

The present embodiment differs from the first embodiment in terms of the shape of the front side of the enclosure 2. The enclosure 2 has no recess 6, and the distance measuring sensor 7 is directly exposed.

Figure 6:
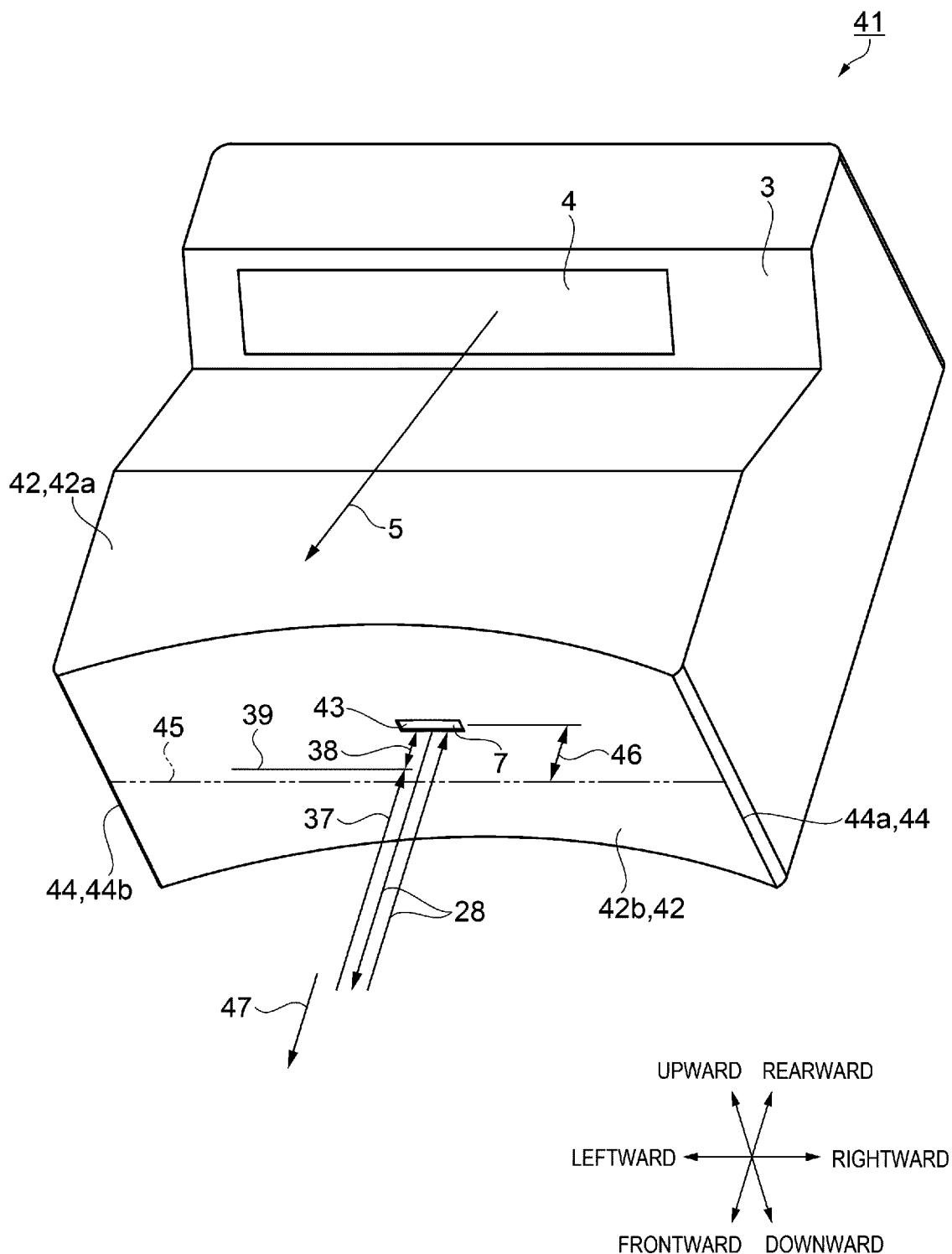
FIG. 6 is a schematic perspective view showing the configuration of the projector according to a third embodiment.

A projector 41 as the projection apparatus includes an enclosure 42 having a shape close to the shape of a rectangular parallelepiped, as shown in FIG. 6. The enclosure 42 has an upper surface 42a, which faces upward. The upper surface 42a is provided with the groove 3. The groove 3 has two intersecting surfaces and is elongated in the right-left direction. The exit port 4 is disposed in one of the two surfaces that is the surface facing frontward. The exit port 4 of the projection system 15 is disposed behind the distance measuring sensor 7. The frontward direction and the rearward direction can be defined as the first direction and the second direction, respectively.

The projector 41 includes the projection system 15 and the distance measuring sensor 7. The enclosure 42 houses the projection system 15 and the distance measuring sensor 7. The distance measuring sensor 7 is used to adjust the focal point of the projection system 15 and outputs the infrared light 28 in the forward direction.

The enclosure 42 has a front surface 42b, which faces frontward. The front surface 42b is formed of a concave curved surface. A window 43 is provided in the front surface 42b. The distance measuring sensor 7 is exposed via the window 43. The window 43 may be located in the deepest position on the concave curved surfaces or in a position shallower than the deepest position.

The enclosure 42 has a frontmost section 44, which is located in the frontmost position in the frontward direction. The frontmost section 44 includes a right frontmost section 44a on the right side of the enclosure 42 and a left frontmost section 44b on the left side thereof. When the enclosure 42 is viewed from above, the frontmost section 44 is located in the frontmost position of the enclosure 42. The distance measuring sensor 7 has the detection range 37, over which distance detection is allowed, and the non-detection range 38, over which no distance detection is allowed and which is shifted from the detection range 37 toward the ranging sensor 7. The distance measuring sensor 7 is disposed at a distance from the frontmost section 44 of the enclosure 42 along the frontward direction, the distance including the non-detection range 38 of the distance measuring sensor 7. The frontmost section 44 can be defined as the endmost section 44 located in the endmost position in the first direction.

A first auxiliary line 45 in FIG. 6 is a line that connects the right frontmost section 44a to the left frontmost section 44b. The first auxiliary line 45 is present in a plane passing through the window 43 and parallel to the upper surface 42a. The distance between the distance measuring sensor 7 and the first auxiliary line 45 is a first distance 46. The first distance 46 is longer than the length of the non-detection range 38 in the frontward direction. The right frontmost section 44a and the left frontmost section 44b can be defined as an endmost section 44a on one side and an endmost section 44b on the other side, respectively.

According to the configuration described above, the first distance 46 between the frontmost section 44 and the distance measuring sensor 7 includes the length of the non-detection range 38. The region facing the frontmost section 44 in the frontward direction is therefore the detection range 37. As a result, the distance measuring sensor 7 can detect the distance to the screen 9 even when the screen 9, which is the target on which the projection is performed, is close to the frontmost section 44 of the projector 41. In particular, the configuration of the projector 41, in which the exit port 4 of the projection system 15 is disposed behind the distance measuring sensor 7, is effective in reduction in the focal length over which the projection is performed.

The boundary 39 between the detection range 37 and the non-detection range 38 of the distance measuring sensor 7 is located behind the frontmost section 44 of the enclosure 42. According to the configuration described above, the first distance 46 between the frontmost section 44 and the distance measuring sensor 7 is longer than the length of the non-detection range 38. The region facing the frontmost section 44 in the frontward direction is therefore the detection range 37. As a result, the distance measuring sensor 7 can detect the distance to the screen 9 even when the screen 9 is close to the frontmost section 44 of the projector 41.

Fourth Embodiment

In the third embodiment described above, the boundary 39 between the detection range 37 and the non-detection range 38 of the distance measuring sensor 7 is located behind the first auxiliary line 45. The boundary 39 between the detection range 37 and the non-detection range 38 of the distance measuring sensor 7 may be located at the first auxiliary line 45.

In FIG. 6, the direction in which the infrared light 28 travels is called a detection direction 47. The boundary 39 between the detection range 37 and the non-detection range 38 of the distance measuring sensor 7 may be located in a plane perpendicular to the detection direction 47 and in contact with the frontmost section 44 in the detection direction 47.

According to the configuration described above, the first distance 46 between the frontmost section 44 and the distance measuring sensor 7 is equal to the length of the non-detection range 38. The region facing the frontmost section 44 in the frontward direction is therefore the detection range 37. As a result, the distance measuring sensor 7 can detect the distance to the screen 9 even when the screen 9 is close to the projector 41. Further, the space occupied by the distance measuring sensor 7 in the enclosure 42 can be reduced.

Fifth Embodiment

The present embodiment differs from the third embodiment in that the front end of each protrusion forms the frontmost section 44.

Figure 7:
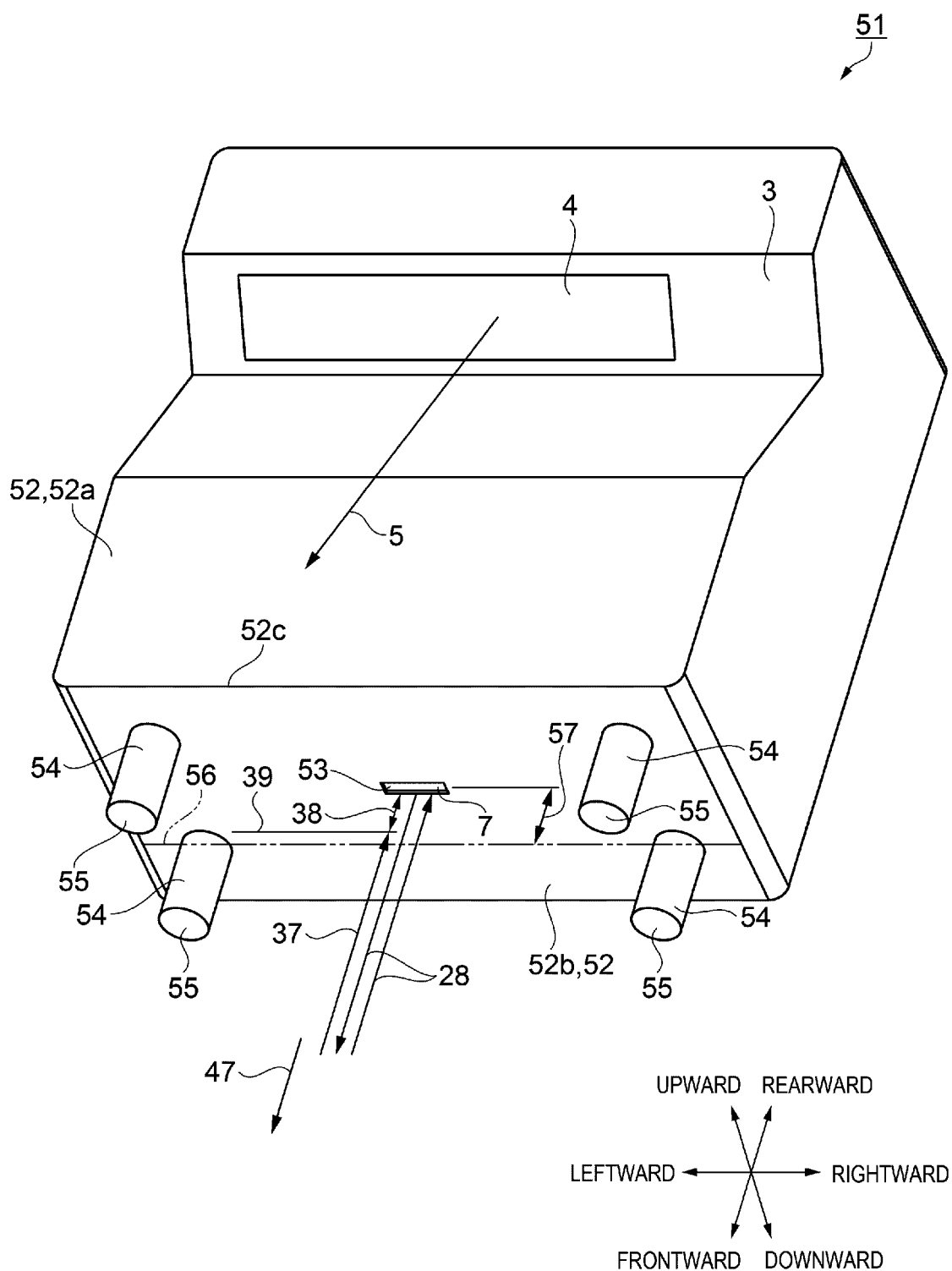
FIG. 7 is a schematic perspective view showing the configuration of the projector according to a fifth embodiment.

A projector 51 as the projection apparatus has an enclosure 52 having a shape close to the shape of a rectangular parallelepiped, as shown in FIG. 7. The enclosure 52 has an upper surface 52a, which faces upward. The upper surface 52a is provided with the groove 3. The groove 3 has two intersecting surfaces and is elongated in the right-left direction. The exit port 4 is disposed in one of the two surfaces that is the surface facing frontward. The exit port 4 of the projection system 15 is disposed behind the distance measuring sensor 7.

The projector 51 includes the projection system 15 and the distance measuring sensor 7. The enclosure 52 houses the projection system 15 and the distance measuring sensor 7. The distance measuring sensor 7 is used to adjust the focal point of the projection system 15 and outputs the infrared light 28 in the forward direction.

The enclosure 52 has a front surface 52b having a substantially oblong shape and facing frontward. A window 53 is provided in the front surface 52b. The distance measuring sensor 7 is exposed via the window 53. Four second protrusions are disposed on the front surface 52b. The second protrusions 54 are disposed in positions close to the four corners of the front surface 52b.

The enclosure 52 has frontmost sections 55, which are located in the frontmost position in the frontward direction. The frontmost sections 55 are the front surfaces of the second protrusions 54. When the enclosure 52 is viewed from above, the frontmost sections 55 are located in the frontmost position of the enclosure 52. The distance measuring sensor 7 has the detection range 37, over which distance detection is allowed, and the non-detection range 38, over which no distance detection is allowed and which is shifted from the detection range 37 toward the ranging sensor 7. The distance measuring sensor 7 is disposed at a distance from the frontmost sections 55 of the enclosure 52 along the frontward direction, the distance including the non-detection range 38 of the distance measuring sensor 7.

A second auxiliary line 56 in FIG. 7 is present in a plane passing through the four frontmost sections 55. The plane faces the window 53 in the up-down direction. The second auxiliary line 56 is parallel to a line 52c, where the upper surface 52a intersects the front surface 52b. The distance between the distance measuring sensor 7 and the second auxiliary line 56 is a second distance 57. The second distance 57 is equal to the length of the second protrusions 54 in the front direction. The second distance 57 is longer than the length of the non-detection range 38 in the frontward direction.

According to the configuration described above, the second distance 57 between the frontmost sections 55 and the distance measuring sensor 7 includes the length of the non-detection range 38. The region facing the frontmost sections 55 in the frontward direction is therefore the detection range 37. As a result, the distance measuring sensor 7 can detect the distance to the screen 9 even when the screen 9, which is the target on which the projection is performed, is close to the frontmost sections 55 of the projector 51. In particular, the configuration of the projector 51, in which the exit port 4 of the projection system 15 is disposed behind the distance measuring sensor 7, is effective in reduction in the focal length over which the projection is performed. The second protrusions 54 function as an approach position regulator.

The boundary 39 between the detection range 37 and the non-detection range 38 of the distance measuring sensor 7 is located behind the frontmost sections 55 of the enclosure 52. According to the configuration described above, the second distance 57 between the frontmost sections 55 and the distance measuring sensor 7 is longer than the length of the non-detection range 38. The region facing the frontmost sections 55 in the frontward direction is therefore the detection range 37. As a result, the distance measuring sensor 7 can detect the distance to the screen 9 even when the screen 9 is close to the frontmost sections 55 of the projector 51. The form of the second protrusions 54 is not limited to a column. The present embodiment is applicable as long as a step is formed between the frontmost sections and the window.

Sixth Embodiment

In the fifth embodiment described above, the boundary 39 between the detection range 37 and the non-detection range 38 of the distance measuring sensor 7 is located behind the second auxiliary line 56. The boundary 39 between the detection range 37 and the non-detection range 38 of the distance measuring sensor 7 may be located at the second auxiliary line 56.

In FIG. 7, the direction in which the infrared light 28 travels is called the detection direction 47. The boundary 39 between the detection range 37 and the non-detection range 38 of the distance measuring sensor 7 may be located in a plane perpendicular to the detection direction 47 and in contact with the frontmost sections 55 in the detection direction 47.

According to the configuration described above, the second distance 57 between the frontmost sections 55 and the distance measuring sensor 7 is equal to the length of the non-detection range 38. The region facing the frontmost sections 55 in the frontward direction is therefore the detection range 37. As a result, the distance measuring sensor 7 can detect the distance to the screen 9 even when the screen 9 is close to the projector 51. Further, the space occupied by the distance measuring sensor 7 in the enclosure 52 can be reduced.

Seventh Embodiment

Figure 8:
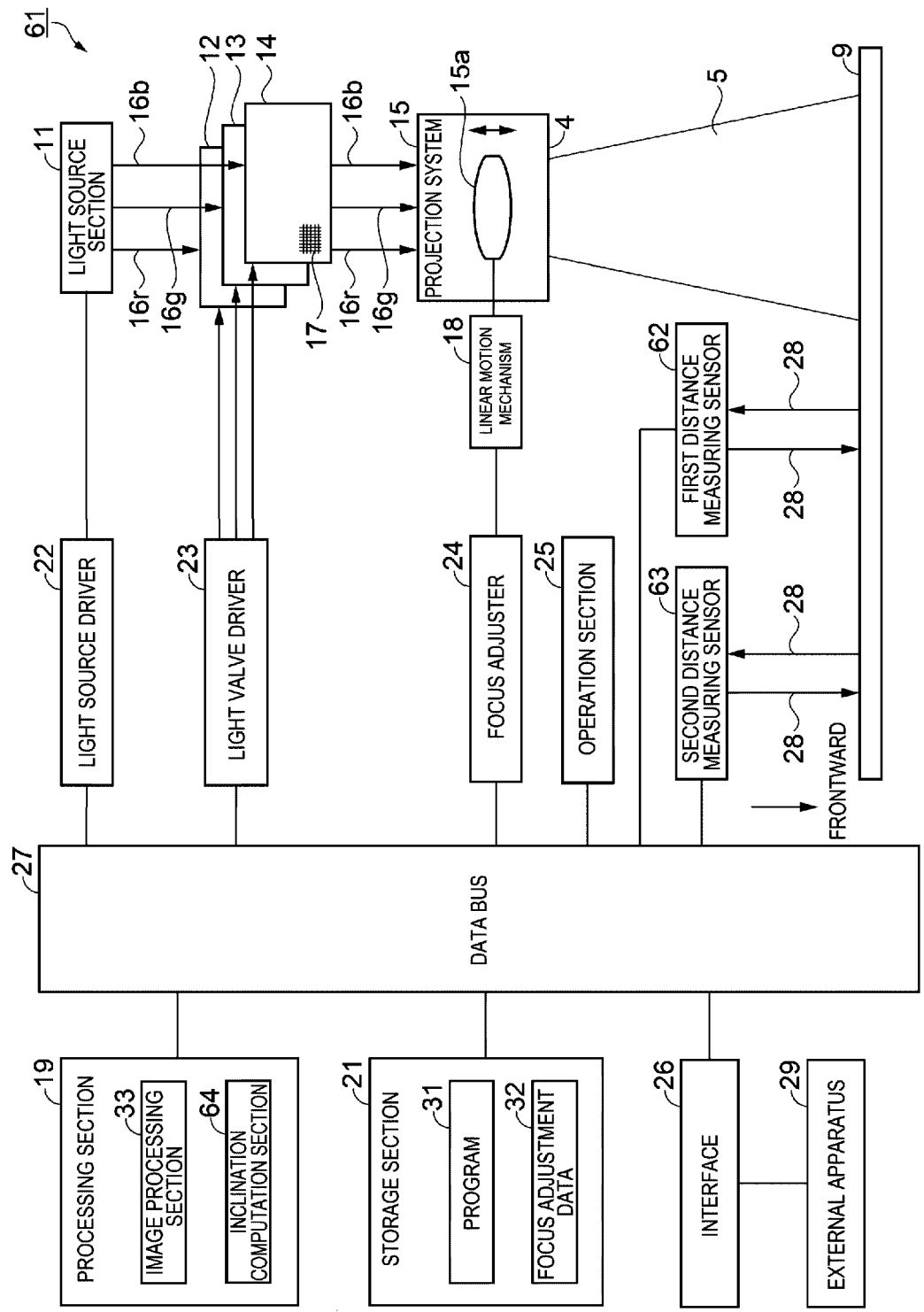
FIG. 8 is a block diagram showing the configuration of the projector according to a seventh embodiment.

The present embodiment differs from the first embodiment in that two sensors that are the same as the distance measuring sensor 7 are provided. A projector 61 as the projection apparatus includes a plurality of distance measuring sensors 7, as shown in FIG. 8. In detail, the projector 61 includes a first distance measuring sensor 62 and a second distance measuring sensor 63 each as the distance measuring sensor.

The processing section 19 includes an inclination computation section 64. The inclination computation section 64 computes the inclination of the screen 9, to which video images are outputted via the projection system 15, by using the outputs from the first distance measurement sensor 62 and the second distance measurement sensor 63. The inclination calculation section 64 outputs data on the result of the computation to the focus adjuster 24. The focus adjuster 24 adjusts the position of the focus adjustment lens 15a of the projection system 15 by using the data on the result of the calculation. The projection system 15 performs the focus adjustment by using the data on the inclination of the screen 9.

Figure 9:
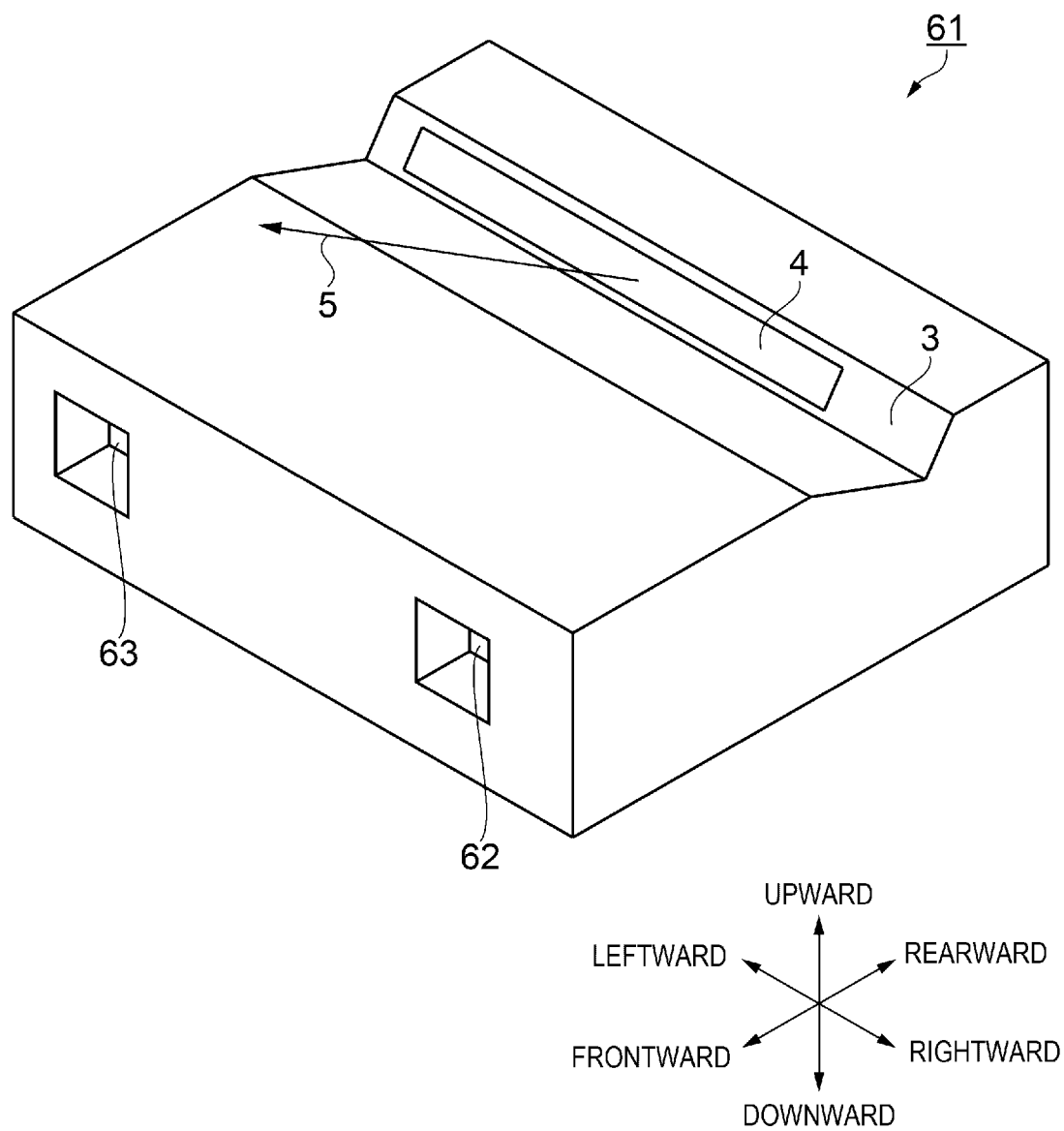
FIG. 9 is a schematic perspective view showing the configuration of the projector.

The first distance measuring sensor 62 is disposed on the right side of the projector 61, as shown in FIG. 9. The second distance measuring sensor 63 is disposed on the left side of the projector 61. In the configuration described above, the first distance measuring sensor 62 and the second distance measuring sensor 63 detect the inclination of the screen 9 with respect to the right-left direction when the screen 9 is rotated around the up-down direction.

According to the configuration described above, the first distance measuring sensor 62, the second distance measuring sensor 63, and the inclination computation section 64 compute the inclination of the screen 9. The projection system 15 performs the focus adjustment in accordance with the inclination of the screen 9. The projection system 15 can therefore perform the focus adjustment even when the screen 9 is rotated around the up-down direction so as to incline with respect to the projector 61.

Eighth Embodiment

Figure 10:
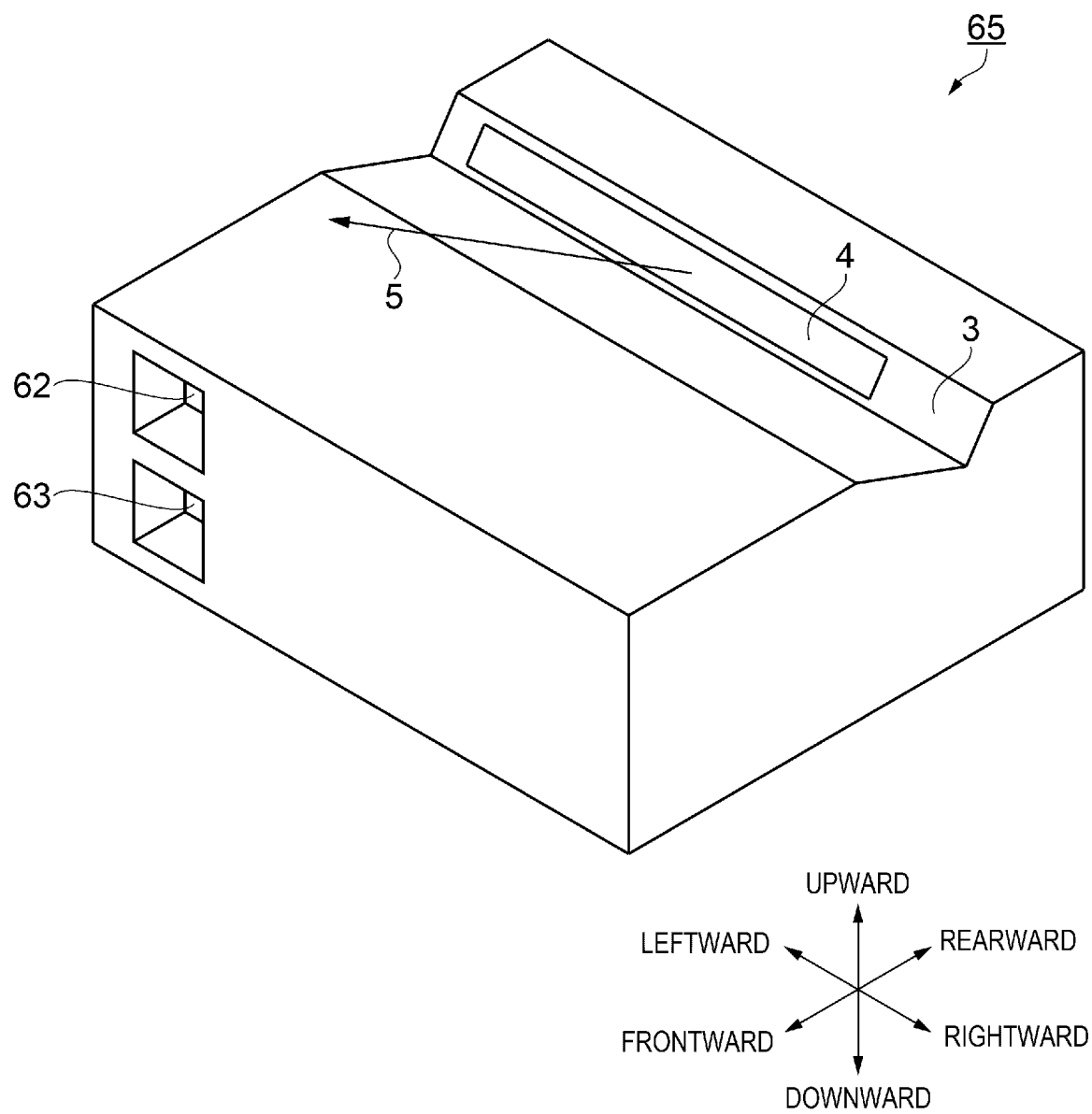
FIG. 10 is a schematic perspective view showing the configuration of the projector according to an eighth embodiment.

The present embodiment differs from the seventh embodiment in that the first distance measuring sensor 62 and the second distance measuring sensor 63 are disposed in different positions. A projector 65 as the projection apparatus includes the first distance measuring sensor 62 and the second distance measuring sensor 63, as shown in FIG. 10. The first distance measuring sensor 62 is disposed on the upper side of the projector 65. The second distance measuring sensor 63 is disposed on the lower side of the projector 65. The thus located first distance measuring sensor 62 and second distance measuring sensor 63 detect the inclination of the screen 9 around the right-left direction.

The configuration described above allows the projection system 15 to perform the focus adjustment even when the screen 9 is rotated in the right-left direction so as to incline with respect to the projector 65.

Ninth Embodiment

Figure 11:
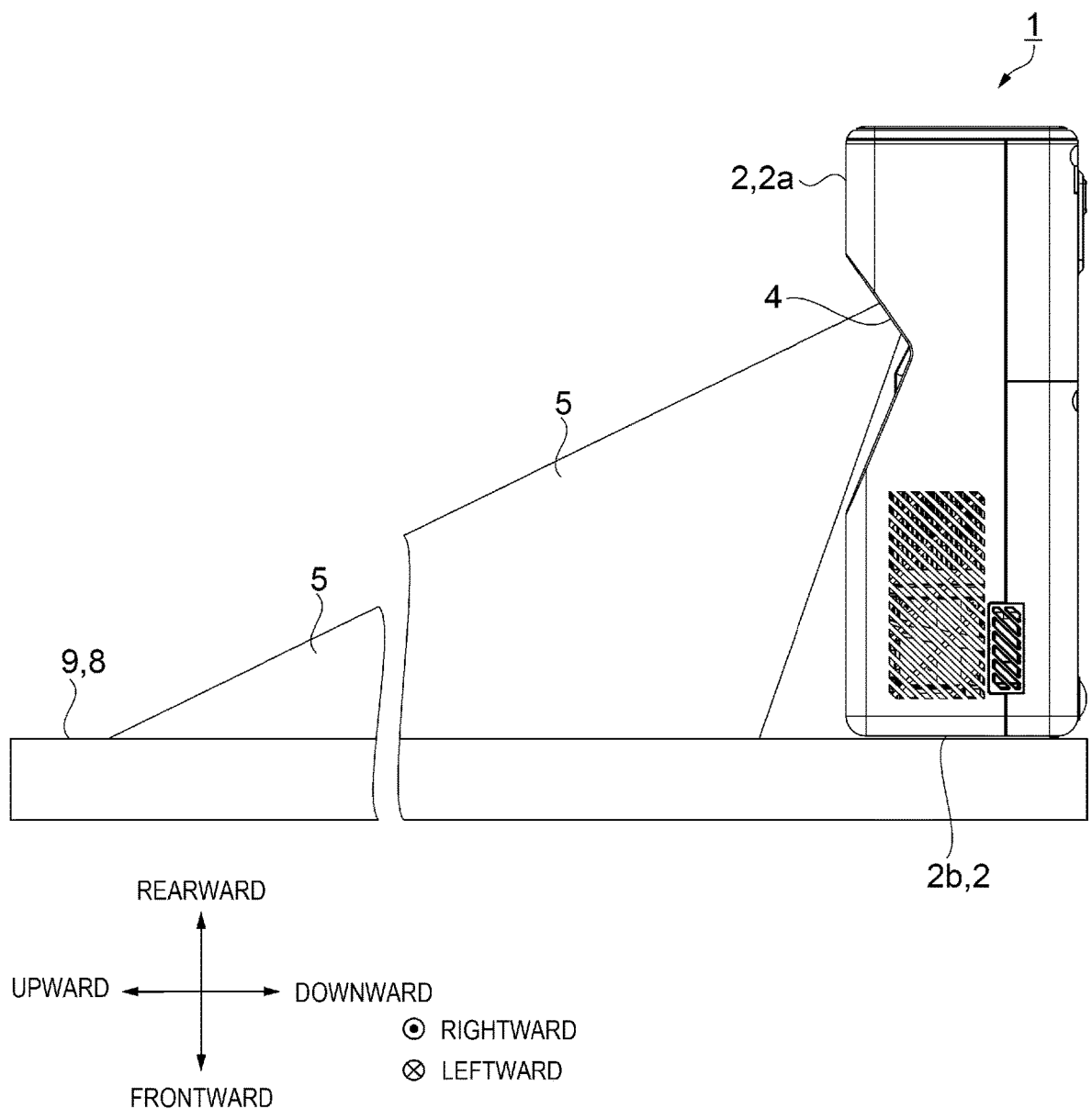
FIG. 11 is a diagrammatic side view for describing the relationship between the projector and the screen.

The present embodiment differs from the first embodiment in that the floor surface 8 also serves as the screen 9. The front surface 2b of the projector 1 is in contact with the screen 9, as shown in FIG. 11. Since the screen 9 falls within the detection range 37 of the distance measuring sensor 7, the distance measuring sensor 7 can measure the distance to the screen 9. The projector 1 can therefore output an image with the focus point precisely adjusted on the screen 9.

What is claimed is:

1. The projection apparatus comprising:
   a projection system;
   a distance measuring sensor that is used to adjust a focal point of the projection system and outputs a detection signal in a first direction; and
   an enclosure that houses the projection system and the distance measuring sensor,
   wherein an exit port of the projection system is disposed at a position which is shifted from the distance measuring sensor in a second direction opposite the first direction,
   the enclosure has a detection opening via which the detection signal exits, and
   the distance measuring sensor has a detection range over which distance detection is allowed and a non-detection range over which no distance detection is allowed and which is shifted from the detection range toward the distance measurement sensor, and the distance measuring sensor is disposed at a distance from the detection opening, the distance including the non-detection range of the distance measuring sensor.

2. The projection apparatus according to claim 1,
   wherein a boundary between the detection range and the non-detection range of the distance measuring sensor is located inside the enclosure and shifted from the detection opening.

3. The projection apparatus according to claim 1,
   wherein a boundary between the detection range and the non-detection range of the ranging sensor is located at the detection opening.

4. The projection apparatus according to claim 1,
   wherein assuming that out of surfaces of the enclosure, a surface in which the exit port of the projection system is disposed is an upper surface, and that an opposite surface from the upper surface is a lower surface, the distance measuring sensor is shifted from a middle point between the upper surface and the lower surface toward the upper surface.

5. The projection apparatus according to claim 1,
   wherein the enclosure has a recess between the distance measuring sensor and the detection opening, and a side surface that forms the recess inclines with respect to a direction perpendicular to a surface of the distance measuring sensor.

6. The projection apparatus according to claim 1, comprising:

a plurality of the distance measuring sensors; and an inclination computation section that uses an output from the distance measuring sensor to compute inclination of a projection surface to which video images are outputted via the projection system, wherein the projection system performs focus adjustment by using data on the inclination of the projection surface.

7. A projection apparatus comprising:

a projection system;

a distance measuring sensor that is used to adjust a focal point of the projection system and outputs a detection signal in a first direction; and an enclosure that houses the projection system and the distance measuring sensor, wherein an exit port of the projection system is disposed at a position which is shifted from the distance measuring sensor in a second direction opposite the first direction, the enclosure includes an endmost section located in an endmost position in the first direction, and the distance measuring sensor has a detection range over which distance detection is allowed and a non-detection range over which no distance detection is allowed and which is shifted from the detection range toward the distance measurement sensor, and the distance measuring sensor is disposed at a distance from the endmost section of the enclosure, the distance including the non-detection range of the distance measuring sensor.

8. The projection apparatus according to claim 7, wherein a boundary between the detection range and the non-detection range of the distance measuring sensor is shifted from the endmost section of the enclosure in the second direction.

9. The projection apparatus according to claim 7, wherein assuming that a direction in which the detection signal travels is a detection direction, a boundary between the detection range and the non-detection range of the distance measuring sensor is located in a plane perpendicular to the detection direction and in contact with the endmost section in the detection direction.

* * * * *